US008369512B2

(12) United States Patent
Le Tourneur

(10) Patent No.: US 8,369,512 B2
(45) Date of Patent: Feb. 5, 2013

(54) DEVICE AND METHOD FOR DETECTING A DIVERGENCE OF AN ADAPTIVE SYSTEM AND USE OF SUCH A DEVICE FOR THE DETECTION OF A DIVERGENCE OF A DIGITAL FILTER

(75) Inventor: Grégoire Le Tourneur, St. Quay-Perros (FR)

(73) Assignee: France Telecom, Paris (FR)

( * ) Notice: Subject to any disclaimer, the term of this patent is extended or adjusted under 35 U.S.C. 154(b) by 1721 days.

(21) Appl. No.: 11/255,487

(22) Filed: Oct. 21, 2005

(65) Prior Publication Data
US 2006/0108530 A1     May 25, 2006

(30) Foreign Application Priority Data
Nov. 4, 2004   (FR) ...................................... 04 11762

(51) Int. Cl.
*H04M 9/08* (2006.01)
(52) U.S. Cl. ......... 379/406.08; 379/406.05; 379/406.11; 379/406.12; 370/289; 370/290
(58) Field of Classification Search .............. 379/406.01–406.16; 370/286–292
See application file for complete search history.

(56) References Cited

U.S. PATENT DOCUMENTS

| | | | | |
|---|---|---|---|---|
| 4,751,730 A * | 6/1988 | Galand et al. | ............ | 379/406.11 |
| 5,463,618 A * | 10/1995 | Furukawa et al. | ............ | 370/290 |
| 5,477,535 A | 12/1995 | Lahdemaki | | |
| 5,926,541 A * | 7/1999 | Irie | ............................. | 379/372 |
| 6,738,358 B2 * | 5/2004 | Bist et al. | ...................... | 370/289 |
| 2003/0223504 A1 * | 12/2003 | Chen et al. | .................... | 375/260 |
| 2004/0240664 A1 * | 12/2004 | Freed | ...................... | 379/406.01 |
| 2005/0169457 A1 * | 8/2005 | Johnston et al. | ......... | 379/406.08 |

FOREIGN PATENT DOCUMENTS

| | | |
|---|---|---|
| FR | 2 748 184 A1 | 10/1997 |
| JP | 2003-324370 A | 11/2003 |

* cited by examiner

*Primary Examiner* — Yuwen Pan
*Assistant Examiner* — Ibraham Sharifzada
(74) *Attorney, Agent, or Firm* — Drinker Biddle & Reath LLP

(57) ABSTRACT

A divergence detection device for an adaptive system comprising means for calculating the energy of an input signal of the system, means for calculating the energy of an output signal of the system and means for analysing the energy of the input signal and the energy of the output signal so as to detect a rise in the energy of the output signal, relative to the energy of the input signal, in case of divergence of the system.

8 Claims, 4 Drawing Sheets

DEVICE AND METHOD FOR DETECTING A DIVERGENCE OF AN ADAPTIVE SYSTEM AND USE OF SUCH A DEVICE FOR THE DETECTION OF A DIVERGENCE OF A DIGITAL FILTER

CROSS-REFERENCE TO RELATED APPLICATIONS

This application claims the benefit of French Application No. 04 11762 filed Nov. 4, 2004, the entire content of which is incorporated herein by reference.

FIELD OF THE INVENTION

The invention pertains to the digital processing of audio signals and relates, in particular, to the detection of a divergence of an adaptive system.

An especially beneficial application of the invention relates to the detection of the divergence of the adaptive filter of an echo canceller of a telecommunications facility.

BACKGROUND OF THE INVENTION

Telecommunications facilities equipped with a so-called "hands free" function are often sensitive to acoustic echo. For example, in the case of a telephone facility, acoustic echo occurs when the signal emitted by the loudspeaker, which corresponds to a signal uttered by a remote talker, is picked up by the microphone. This is then manifested, for this remote user, by the reproduction, in the earpiece, of the signal with an offset with respect to the instant of emission.

Likewise, the presence of a two wire/four wire line transformer in the remote telecommunications facilities, the function of which is to process the signals received so as to render them compatible with the telephone line, is apt to bring about an electrical echo by returning over the line a part of the signal received.

The electrical echo or the acoustic echo is apt to disturb communications when the delay in the chain becomes significant.

Reduction, or even cancellation of the echo, is achieved by equipping the facilities with an echo canceller device AEC or EEC. This type of device generally incorporates an adaptive filtering algorithm whose coefficients are calculated in such a way as to minimize the error between the echo and an estimate of the echo. The coefficients are calculated in a recurrent manner on the basis of previously calculated coefficients, of the error between the estimate of the echo and the echo, of the reference signal and of an adaptation stepsize µ, on the basis of the following relation:

$$H(n+1)=H(n)+\mu(n)*\text{error}(n)*f(X(n))$$

in which:

H(n+1) and H(n) represent the coefficients of the adaptive filter at the instant n+1 and at the instant n, respectively;
f(X(n)) is a function of the vector of the last L samples of the signal emitted X(n), varying according to the families of algorithms considered;
µ(n) represents the adaptation stepsize;
error(n) represents the distance between the real echo and the estimated echo.

Represented in FIG. 1 is the general architecture of an echo cancellation module, according to the state of the art. Such a module incorporates an adaptive filter 10 which estimates, on the basis of the signal X(n) emitted by a facility, the electrical or acoustic echo E and which uses a subtractor 13 to subtract the estimate of the echo from a signal received.

As is known, such a filter constitutes a highly recursive system, requiring appropriate supervision to guarantee its stability and to obtain convergence. In fact, the adaptation of the coefficients according to the equation mentioned hereinabove should be done only in the presence of echo alone so as to correctly estimate the real echo, that is to say in the absence of simultaneous local speech. If this condition is not fulfilled, the adaptation will not be done correctly and, in the limit, the filter may become unstable and transform itself into a noise generator. This sensitivity to instability is aggravated by the speed with which the algorithm converges: a fast algorithm will converge speedily towards an optimal filter if the signal originating from a microphone contains echo only, but will diverge equally speedily if another signal, for example speech, is superimposed on the echo signal.

To alleviate this drawback, various techniques may be used, in such a way as to curb the adaptation of the filter, that is to say to permit the updating of the coefficients only in a situation of echo alone.

A first technique consists in using detectors of vocal activity to determine the state of the system. The adaptation strategy is applied as a function of the state of the system, in such a way in particular as to instigate the adaptation of the coefficients of the filter only in the presence of echo alone.

Other techniques consist in transforming the adaptation stepsize, which is generally fixed, into a parameter tending to zero in the presence of speech, in such a way as to halt the adaptation of the coefficients of the filter. To this end, reference may be made to French patent application 96 05 312 in the name of the applicant.

The document JP-A-2003 324370 describes a comparable system based on the calculation of the energy ratio between the signal of the loudspeaker and the signal of the microphone.

Such a system makes it possible to decrease the value of the adaptation stepsize for the coefficients of the filter, and hence the convergence of the filter. However, in no case does it make it possible to detect a divergence thereof.

Finally, other techniques implement a comparison of the error after convergence with the level of the background noise, so as to halt the adaptation and, thereby, to prevent the divergence of the filter. To this end, reference may be made to U.S. Pat. No. 5,477,535, in which the adaptation of the filter is disabled when the error between the estimate of the echo and the echo reaches a threshold value, so as to avoid any divergence of the filter.

According to these various techniques, the main aim is to prevent any divergence of the filter. No solution is advocated when divergence of the filter occurs despite everything, and such divergence may indeed occur in particular situations of prolonged double speech, that is to say in the presence of local and remote speech, or of very abrupt variations of acoustics in front of the terminal, for example when a sheet of paper is placed over the mic of the terminal.

SUMMARY OF THE INVENTION

In view of the foregoing, the aim of the invention is to alleviate the drawbacks of the prior art and to allow detection of divergence in an adaptive system so that procedures can subsequently be implemented to cause the system to converge again.

The subject of the invention is therefore a divergence detection device for adaptive system, characterized in that it comprises means for calculating the energy of an input signal of the system, means for calculating the energy of an output signal of the system and means for analysing the energy of the input signal and of the output signal so as to detect a rise in the energy of the output signal, relative to the energy of the input signal, in case of divergence of the system.

According to another characteristic of the invention, the device comprises means for calculating the ratio between the energy of the output signal and the energy of the input signal, and means of comparison for comparing the ratio calculated with a threshold value corresponding to a divergence of the system.

According to another characteristic of the invention, the device furthermore comprises an up/down counter intended to be incremented and decremented as a function of the result of the comparison carried out by the means of comparison, and means for comparing the count value of the up/down counter with a divergence detection threshold value.

Thus, while the detection of the increase in the energy of the output signal makes it possible to detect an instantaneous divergence of the system, the use of a counter, incremented each time the energy of the output signal increases above a predetermined threshold, makes it possible to detect a situation of steady divergence so as to avoid any false alarm and to allow the system the possibility of converging again spontaneously.

The subject of the invention is also a use of a system as defined hereinabove for the detection of a divergence of an adaptive filter of an echo canceller of a telecommunications facility, of a system implementing a predictive algorithm or of a recursive digital filter.

According to another subject, the invention relates to a method of detecting a divergence of an adaptive system, characterized in that it comprises this step consisting in
calculating the energy of an input signal of the system and the energy of an output signal of the system and
analysing the energy of the input signal and of the output signal so as to detect a rise in the energy of the output signal, relative to the energy of the input signal, in case of divergence.

In one mode of implementation, in the course of the analysis of the energy of the input signal and of the output signal, the ratio between the energy of the output signal and the energy of the input signal is calculated and the ratio calculated is compared with a threshold value, and the up/down counter is incremented or decremented as a function of the result of the comparison.

The counter may furthermore be incremented if the ratio is greater than a first threshold value corresponding to a divergence of the system.

Moreover, the counter can be decremented if the ratio is less than the threshold value.

According to another characteristic of the method according to the invention, the count value of the up/down counter is moreover compared with a second divergence detection threshold value.

For example, the threshold value is a fixed threshold value. It is however possible to use a variable threshold value.

BRIEF DESCRIPTION OF THE DRAWINGS

Other aims, characteristics and advantages of the invention will become apparent on reading the following description, given merely by way of nonlimiting example, and offered with reference to the appended drawings, in which.

DETAILED DESCRIPTION OF THE INVENTION

Figure 2:
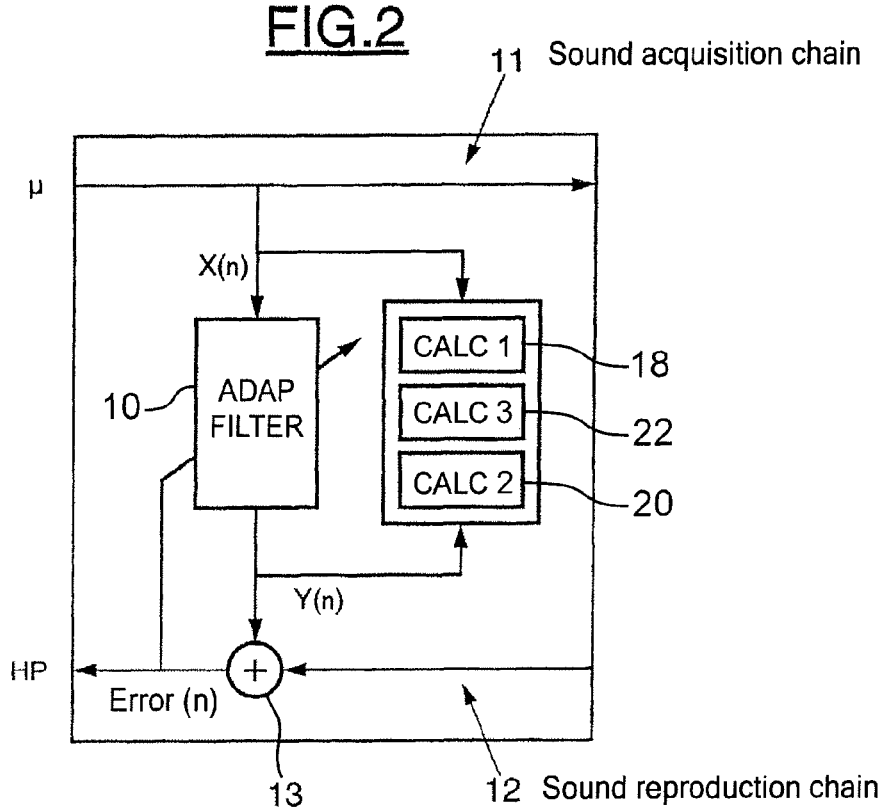
FIG. 2 illustrates the structure of an adaptive filter of an echo canceller in accordance with the invention.

Represented in FIG. 2 is the general architecture of a divergence detection device for an adaptive system in accordance with the invention.

Such a device may be used to detect the divergence of any type of system implementing an adaptive algorithm, such as an electrical echo canceller, a prediction algorithm, a recursive digital filter, etc. Such a device may also be used, in a general manner, to detect the divergence of any adaptive algorithm prone to instability.

Figure 1:
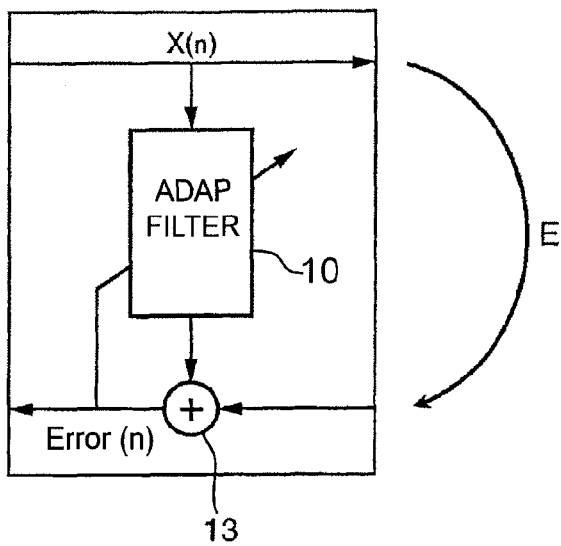
FIG. 1, mention of which has already been made, illustrates the structure of an adaptive filter of a conventional echo canceller.

In FIG. 2, the general numerical reference 10 illustrates, as in FIG. 1, the adaptive filter with transfer function H whose divergence it is wished to detect. In the exemplary embodiment considered, this filter consists of an acoustic or electrical echo canceller, the function of which is, as is known per se, to estimate the echo conveyed on a sound reproduction chain 12 hooked up to the loudspeaker of a telecommunications facility (not represented), on the basis of a signal X(n) conveyed on a sound acquisition chain 11 hooked up to a microphone (not represented) of the telecommunications facility, and to subtract the estimated echo from the received signal on the sound reproduction chain by means of a subtractor 13.

Figure 3:
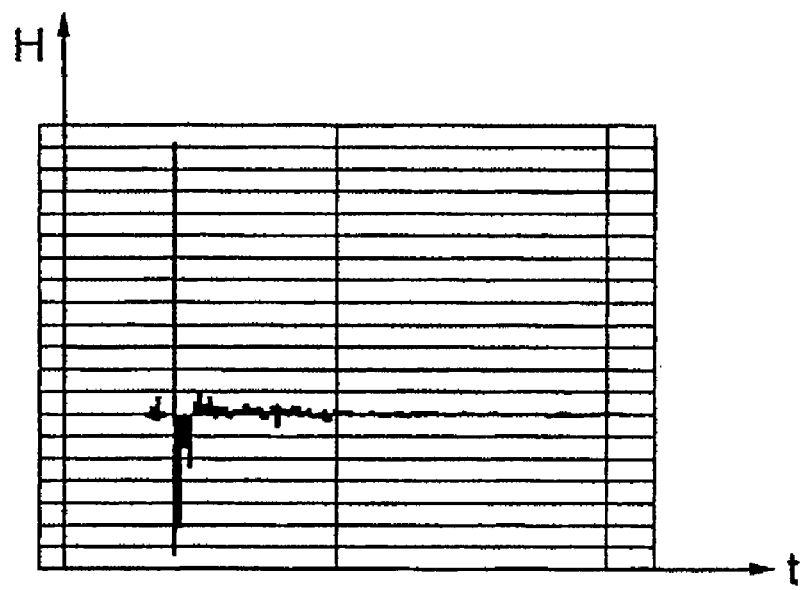
FIG. 3 is a curve illustrating the variation as a function of time of the coefficients of the filter when the system has converged.

Referring to FIG. 3, during normal operation, that is to say when the filter 10 has converged, the coefficients of the filter are an approximation of the impulse response of the system to be estimated, that is to say of the echo. Thus, this response corresponds, either to a response of electrical coupling of a two wire/four wire transformer, or to a response of coupling between a sound pickup system and a sound reproduction system that are connected to the sound acquisition chain 11 and to the sound reproduction chain 12, respectively.

Figure 4:
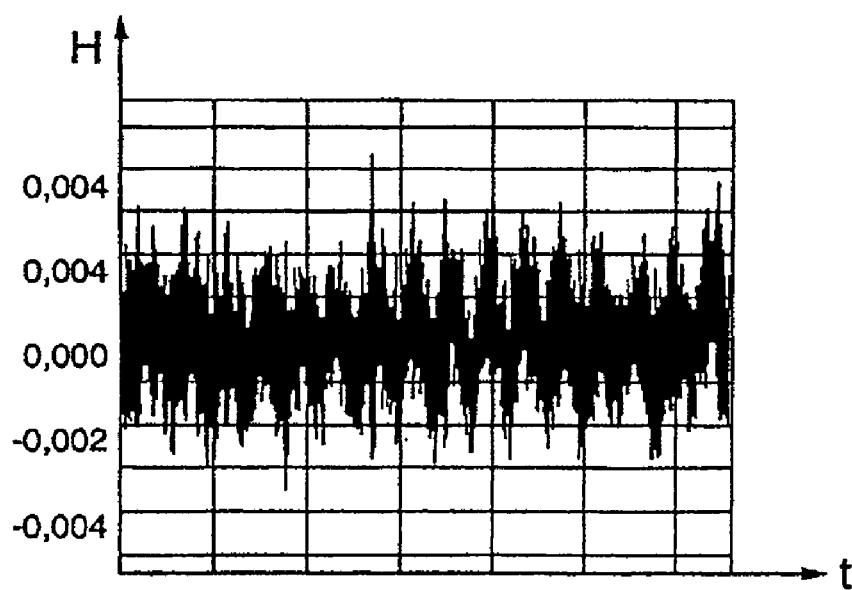
FIG. 4 is a curve showing the evolution as a function of time of the coefficients of the filter in case of divergence.

As may be seen in this FIG. 3, the impulse response firstly possesses a more or less marked peak at the start of the response, corresponding to the direct coupling, followed by a zone corresponding to the various distant echoes and reflections. Each impulse response is unique and characteristic, but nevertheless possesses the profile represented in FIG. 3. Conversely, as represented in FIG. 4, in case of divergence, the output of the filter 10 resembles a noise generator, and the coefficients of the filter take incoherent values.

By calculating the estimates of the energies of the signals at the input and at the output of the filter, and by detecting a relative rise in the energy of the output signal of the filter, corresponding to the estimate of the echo, it is possible to retrieve the order of magnitude of the energy of the impulse response, or else the coupling value squared.

Thus, referring again to FIG. 2, the device according to the invention, which consists for example of a software module integrated with a system for digital processing of acoustic or electrical signals also incorporating the acoustic or electrical echo canceller 10, comprises a first module 18 for calculating the energy of a reference signal X(n) consisting of the signal emitted by a microphone, transmitted over the sound acquisition chain 11, a second module 20 for calculating the energy of the output signal of the filter 10 constituting the estimated signal of the echo Y(n) and a third module 22 for calculating the ratio R between the output signal Y(n) of the filter 10 and the input signal X(n) of the filter 10.

This ratio R remains relatively constant, the physical impulse response of the filter not varying within significant proportions over time, in particular within a time scale corresponding to the duration of a communication. Moreover, this quantity grows with the convergence of the filter, the initial value being zero when the filter has not yet converged.

When the filter has converged, the ratio R is always less than a threshold proportional to the value of the energy of the filter to be identified, or of the coupling of the system to be identified.

Figure 5:
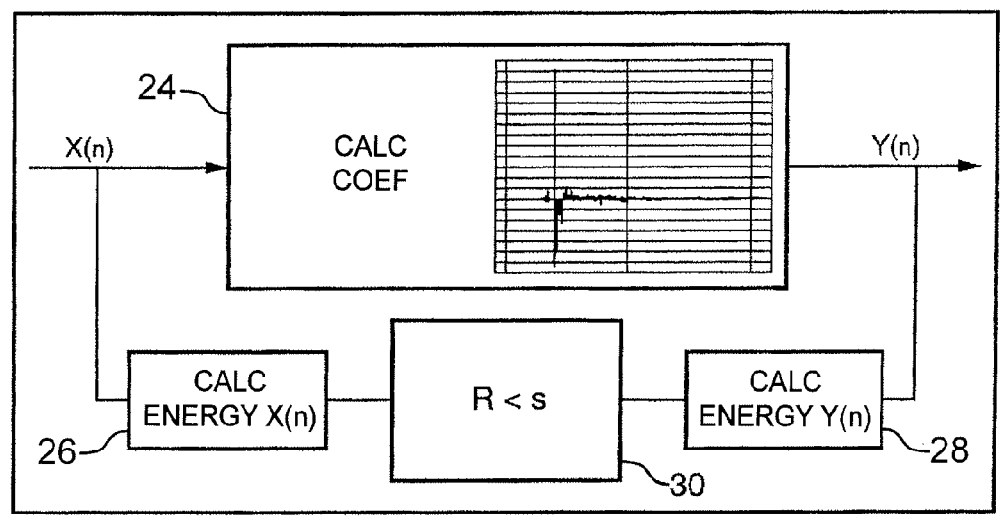
FIG. 5 is a diagram illustrating the behaviour of the detection device in accordance with the invention in the case of convergence.

Specifically, with reference to FIG. 5 which represents the principal phases of the method according to the invention, after calculation of the coefficients of the filter (step 24), the calculation of the energy of the input signal X(n) and of the output signal Y(n) is carried out (steps 26 and 28). The relative rise in the energy of the output signal is calculated during the next step 30 by calculating the ratio R between the energy of the output signal and the energy of the input signal and comparing this ratio with a first threshold value s.

Figure 6:
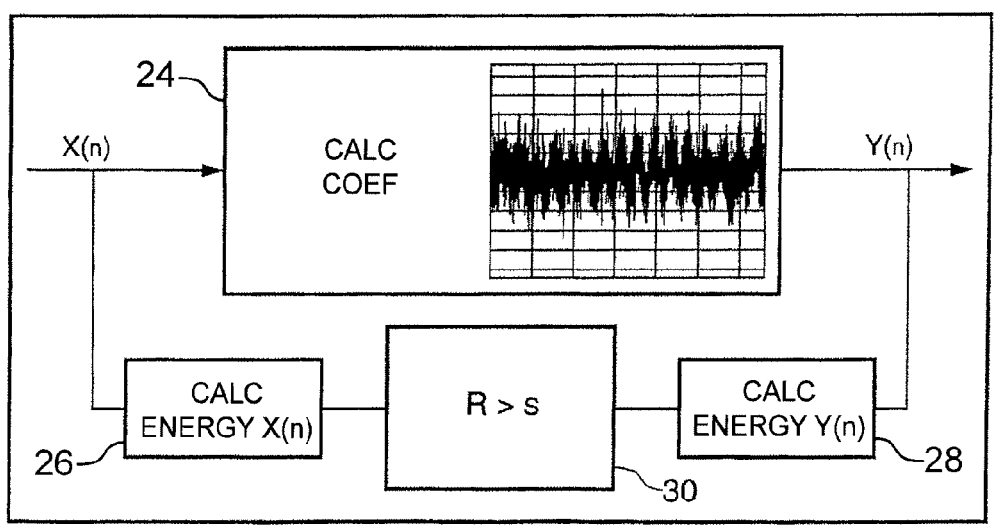
FIG. 6 is a diagram illustrating the behaviour of the divergence detection device in accordance with the invention in the case of divergence.

On the other hand, in case of divergence, as may be seen in FIG. 6 in which steps identical to those of FIG. 5 are designated by the same references, the relation linking the ratio R of the energies and the coupling or the energy of the filter to be identified, is no longer satisfied. There is an abrupt and fast rise in this ratio R. It has moreover been noted that this rise lasts for a relatively long duration.

The detection of divergence is therefore based on the overshooting of a predetermined threshold. Specifically, when a divergence occurs, the ratio R remains greater, permanently, than this threshold value s (step 30).

It is thus important to detect divergence, while avoiding false alarms.

To do this, during the analysis of the energies, the quantity R is compared by the calculation module 22 with a second threshold value and, when the value R overshoots this threshold, an up/down counter incorporated for example with the calculation module 22 is incremented. Conversely, when the ratio R drops back below the threshold value, the up/down counter is decremented. One then decides that divergence has become steadily established as soon as the count value of the up/down counter overshoots a predetermined threshold value, so as to avoid untimely false detections. It will however be noted that the decrementation of the up/down counter, if the ratio R becomes less than the threshold value, makes it possible to avoid the detection of divergence when an accumulation of isolated overshoots occurs in the course of a communication.

The implementation of the method which is the subject of the invention as described, is illustrated with reference to FIG. 7.

Figure 7:
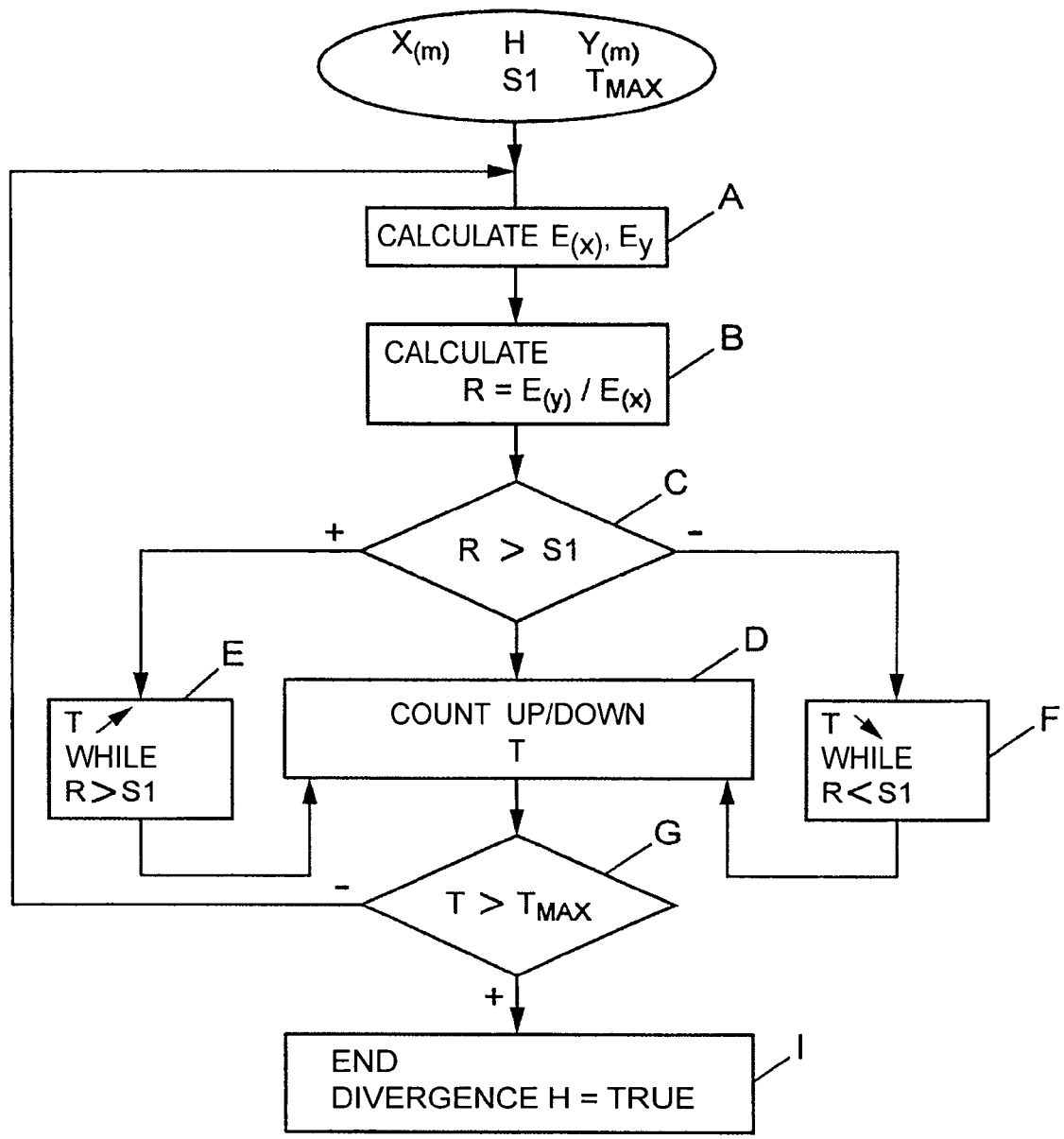
FIG. 7 represents a flowchart of the steps allowing the implementation of the method which is the subject of the invention.

In the aforesaid FIG. 7

H denotes the transfer function of the filter;

X(n) and Y(n) denote the signal at the input and at the output, respectively, of the filter 10;

A denotes the step of calculating the estimate of the energies E(x) of the signal X(n) and E(y) of the signal Y(n). The calculation of each of the aforesaid energies may be concomitant or successive;

B denotes the step of calculating the ratio R=E(y)/E(x);

C denotes the step of comparing the value of the ratio with a first threshold value S1. The value of S1 may be variable;

D denotes a step of initializing and of counting up/down concomitant with the comparison step C and delivering a time count value;

E denotes a step of incrementation (counting up) of the up/down counting D, while the comparison of superiority R>S1 is satisfied;

F denotes a step of decrementation (counting down) of the up/down counting D, while the comparison of superiority R>S1 is not satisfied;

G denotes a step of comparing the time count value T with a second threshold value $T_{MAX}$. A negative response to the test comparison step G is followed by a return to step A for continuation of the method. A positive response to the test comparison step is followed by a step of ending the method, the divergence of the filter with transfer function H being satisfied and detected;

I denotes a step of ending the method in which the divergence of the transfer function H of the filter is satisfied by the value "true".

It will also be noted that this procedure for detecting divergence furthermore possesses the advantage of circumventing detections of double speech, the calculations being performed on signals relating solely to the signal received. There is therefore no interaction with the double speech for the detection of divergences, rendering the system more reliable.

The choice of the first threshold value with which the ratio R is compared and of the second threshold value with which the count level of the up/down counter is compared, makes it possible to adapt the divergence detection device to the system to which it is applied. Specifically, the larger these thresholds, the more reliable is the detection of divergence, but the more delayed will be the activation of the decision.

For echo cancellers, a compromise needs to be determined so as to avoid the unpleasant generation of noise at the filter output. Once adjusted, the system allows triggering that is fast and reliable enough for the divergence of the filter not to be perceived.

Finally, it will be noted that the first threshold value may consist of a fixed threshold value, but may also be a variable value, for example dependent on a function. In particular, for an echo canceller module, it is possible to use a detection threshold varying as a function of the law of evolution of the coefficients of the filter and, after convergence, to use a fixed threshold.

After detection of a divergence, a processing may then be implemented to eliminate the cause of the divergence. By way of example, it is possible to reset the coefficients of the adaptive filter to zero or restore them to a state corresponding to a convergence. It is also possible to modify the value of the adaptation stepsize of the algorithm or to implement any other process aimed at rendering the system more stable.

The invention claimed is:

1. A divergence detection device for an adaptive system including a filter, the divergence detection device comprising:
    means for calculating the energy of an input signal of the filter, means for calculating the energy of an output signal of the filter,
    means for analysing the energy of the input signal and of the output signal so as to detect a rise in the energy of the output signal, relative to the energy of the input signal, in case of divergence of the adaptive system,
    means for calculating a ratio between the energy of the output signal and the energy of the input signal, means of comparison for comparing the ratio calculated with a threshold value corresponding to a divergence of the adaptive system, means for resetting coefficients of the filter to zero or for restoring the coefficients to a state corresponding to a convergence, when the ratio between the energy of the output signal and the energy of the input signal is greater than the threshold value, means for counting up/down intended to be incremented and decremented as a function of the results of the comparison carried out by the means of comparison, and means for comparing a count value of the up/down counter with a divergence detection threshold value.

2. A method of detecting a divergence of an adaptive system including a filter, the method comprising the steps:

calculating the energy of an input signal of the filter and the energy of an output signal of the filter; and analysing the energy of the input signal and of the output signal so as to detect a rise in the energy of the output signal, relative to the energy of the input signal, in case of divergence, wherein the analysis includes:

calculating a ratio between the energy of the output signal and the energy of the input signal, comparing the ratio with a threshold value, resetting coefficients of the filter to zero or restoring the coefficients to a state corresponding to a convergence, when the ratio between the energy of the output signal and the energy of the input signal is greater than the threshold value, incrementing or decrementing an up/down counter as a function of the results of the comparison, and comparing a count value of the up/down counter with a divergence detection threshold value.

3. The method according to claim 2, wherein the counter is incremented if the ratio is greater than a first threshold value corresponding to a divergence of the system.

4. The method according to claim 2, wherein the counter is decremented if the ratio is less than the threshold value.

5. The method according to claim 2, wherein the count value of the up/down counter is moreover compared with a second divergence detection threshold value.

6. The method according to claim 2, wherein the first threshold value is a fixed threshold value.

7. The method according to claim 2, wherein the first threshold value is variable.

8. The method according to claim 2, wherein the said method is adapted for the detection of a divergence of an adaptive filter of an echo canceller of a telecommunications facility, of a system implementing a predictive algorithm or a recursive digital filter.

* * * * *